United States Patent
Gao et al.

(10) Patent No.: US 10,627,667 B2
(45) Date of Patent: Apr. 21, 2020

(54) LIQUID CRYSTAL CELL AND PHOTOGRAPHIC SYSTEM

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/028,147

(22) Filed: Jul. 5, 2018

(65) Prior Publication Data
US 2019/0155096 A1    May 23, 2019

(30) Foreign Application Priority Data
Nov. 23, 2017  (CN) .......................... 2017 1 1178006

(51) Int. Cl.
*G02B 6/00* (2006.01)
*G02F 1/1335* (2006.01)
(Continued)

(52) U.S. Cl.
CPC ..... *G02F 1/133526* (2013.01); *G02B 5/1809* (2013.01); *G02B 5/1876* (2013.01);
(Continued)

(58) Field of Classification Search
CPC .. G02F 1/133526; G02F 1/13471; G02F 1/29; G02F 1/1337; G02F 1/134363; G02B 5/1809; G02B 5/3025
See application file for complete search history.

(56) References Cited

U.S. PATENT DOCUMENTS 5,299,289 A * 3/1994 Omae ............... G02F 1/133371
                                              348/E9.027
8,537,304 B2 * 9/2013 Kishioka ............. G02B 5/3016
                                              345/88
(Continued)

FOREIGN PATENT DOCUMENTS

CN     101040336 A     9/2007
CN     101073022 A    11/2007
(Continued)

OTHER PUBLICATIONS

First Office Action for Chinese Patent Application No. 20171178006.8 dated Dec. 18, 2019.

*Primary Examiner* — Ellen E Kim
(74) *Attorney, Agent, or Firm* — Calfee, Halter & Griswold LLP

(57) ABSTRACT

A liquid crystal cell and a photographic system are described. The liquid crystal cell includes: a refractive index switching layer including a liquid crystal layer consisting of liquid crystals and a substrate on which a plurality of diffractive lenses are formed; a first transparent electrode layer; and a second transparent electrode layer. The liquid crystal layer has a first refractive index and a second refractive index when the first transparent electrode layer and the second transparent electrode layer are powered on and off, respectively. The first refractive index is greater than the second refractive index, and the first refractive index is the same as the refractive index of the diffractive lenses. By means of this solution, free and controllable switching between light field imaging and conventional photographic imaging can be realized in the same system.

16 Claims, 4 Drawing Sheets

(51) Int. Cl.
*G02F 1/1343* (2006.01)
*G02F 1/1337* (2006.01)
*G02F 1/29* (2006.01)
*G02B 5/18* (2006.01)
*G02F 1/1347* (2006.01)
*G02F 1/1333* (2006.01)
*G02B 5/30* (2006.01)
*G02F 1/139* (2006.01)

(52) U.S. Cl.
CPC ........ *G02F 1/1337* (2013.01); *G02F 1/13471* (2013.01); *G02F 1/133371* (2013.01); *G02F 1/134327* (2013.01); *G02F 1/134363* (2013.01); *G02F 1/29* (2013.01); *G02B 5/3025* (2013.01); *G02F 1/1393* (2013.01); *G02F 2001/133368* (2013.01); *G02F 2001/134372* (2013.01); *G02F 2001/294* (2013.01); *G02F 2203/22* (2013.01); *G02F 2203/28* (2013.01)

(56) References Cited

U.S. PATENT DOCUMENTS

| | | | | |
|---|---|---|---|---|
| 8,587,734 B2* | 11/2013 | Li | | G02C 7/08 349/13 |
| 8,675,148 B2* | 3/2014 | Takagi | | G02B 27/2214 349/139 |
| 8,767,135 B2* | 7/2014 | Hikmet | | A47F 11/10 349/34 |
| 9,784,983 B1* | 10/2017 | Zha | | G02B 27/2214 |
| 2006/0018025 A1* | 1/2006 | Sharon | | H04N 9/3129 359/618 |
| 2007/0182915 A1* | 8/2007 | Osawa | | G02B 3/08 349/201 |
| 2007/0183293 A1* | 8/2007 | Murata | | G02F 1/29 369/112.02 |
| 2008/0106806 A1 | 5/2008 | Hendriks et al. | | |
| 2010/0328440 A1* | 12/2010 | Willemsen | | G02B 27/2214 348/59 |
| 2013/0135545 A1* | 5/2013 | Jung | | G02F 1/13306 349/33 |
| 2014/0111715 A1* | 4/2014 | Jeong | | G02B 27/26 349/15 |
| 2015/0036084 A1* | 2/2015 | Srivastava | | G02F 1/133753 349/96 |
| 2015/0036209 A1* | 2/2015 | Ichihashi | | G02B 27/2214 359/315 |
| 2018/0231867 A1 | 8/2018 | Gao et al. | | |

FOREIGN PATENT DOCUMENTS

| | | |
|---|---|---|
| CN | 101939998 A | 1/2011 |
| CN | 106226930 A | 12/2016 |

* cited by examiner

LIQUID CRYSTAL CELL AND PHOTOGRAPHIC SYSTEM

RELATED APPLICATION

This application claims priority to Chinese patent application No. 201711178006.8 filed on Nov. 23, 2017, the entire contents of which are incorporated herein by reference.

TECHNICAL FIELD

The present disclosure relates to the technical field of imaging, in particular to a liquid crystal cell and a photographic system.

BACKGROUND

The conventional digital photographic system theoretically can only obtain the clear image of a single object plane. The limited width of a photodetector unit can extend the scope of this clear imaging to a certain depth, i.e. depth of field. During conventional imaging, the light radiation emitted by the entire aperture of the optical system is usually integrated directly, so that the scope of the depth of field is limited by the size of the aperture. In order to obtain a clear image with a large depth of field, the imaging aperture must be narrowed, which will in turn cause a decrease in the resolution of the image and a loss in the signal-to-noise ratio of the image. Meanwhile, given a certain aperture size, in order to obtain clear images at different depth positions, mechanical focusing must be performed before imaging.

In the light field photographic system, images at any depth position can be obtained by digital focusing, so mechanical focusing is no longer necessary, and the problem of the depth of field being limited by the aperture size is also solved. Nevertheless, the resolution of imaging of the light field photographic system is lower than the resolution of imaging of the conventional photographic system.

SUMMARY

In view of the above, a liquid crystal cell and a photographic system are needed to solve the one or more problems existing in the prior art.

According to an aspect of the present disclosure, a liquid crystal cell is provided, which comprises a refractive index switching layer comprising a liquid crystal layer consisting of liquid crystals and a substrate on which a plurality of diffractive lenses are formed; a first transparent electrode layer; and a second transparent electrode layer;

wherein the liquid crystal layer has a first refractive index under the condition that the first transparent electrode layer and the second transparent electrode layer are powered on, and the liquid crystal layer has a second refractive index under the condition that the first transparent electrode layer and the second transparent electrode layer are powered off; and wherein the first refractive index is greater than the second refractive index, and the first refractive index is the same as the refractive index of the diffractive lenses.

In certain exemplary embodiments, the liquid crystal cell further comprises a polarizer arranged on a side of the refractive index switching layer close to or far from the diffractive lenses.

In certain exemplary embodiments, a plurality of concentric circular diffractive phase grating strips are arranged on a side of each of the plurality of diffractive lenses facing the liquid crystal layer, a gap between two adjacent circular diffractive phase grating strips is a grating groove, and the liquid crystals at least fill the grating groove.

In certain exemplary embodiments, the first transparent electrode layer and the second transparent electrode layer are located at the same side of the refractive index switching layer; or the first transparent electrode layer and the second transparent electrode layer are located at different sides of the refractive index switching layer.

In certain exemplary embodiments, one of the first transparent electrode layer and the second transparent electrode layer is a strip electrode layer comprising parallel strip electrodes, and the other of them is a planar electrode layer.

In certain exemplary embodiments, parameters of the circular diffractive phase grating strip satisfy the following equations:

$$N = 2^m;$$

$$\phi = \frac{2\pi}{N};$$

$$h = \frac{\frac{\lambda}{N}}{n - n_0};$$

$$d_j = r_j - r_{j-1};$$

$$r_j = \sqrt{jf\lambda};$$

$$t_j = \begin{cases} \dfrac{d_j}{\frac{N}{2}}, & (j \text{ is an even number}) \\ d_j - \sum_{i=1}^{m-1} \dfrac{d_{j+1}}{2^i}, & (j \text{ is an odd number}) \end{cases};$$

wherein, N is the number of steps of each of the circular diffractive phase grating strips, m is a natural number, φ is a phase difference between adjacent steps, h is a step height, λ is a wavelength of incident polarized light, n is a refractive index of the diffractive lens, $n_0$ is the second refractive index, $d_j$ is a Fresnel zone width, j is a Fresnel zone number, $r_j$ is a Fresnel zone radius, f is a focal length of a Fresnel lens, $t_j$ is a step width of the circular diffractive phase grating strip.

In certain exemplary embodiments, the plurality of diffractive lenses are arranged in the form of a matrix.

According to another aspect of the present disclosure, a photographic system is provided, which comprises an objective lens, the above-mentioned liquid crystal cell and a photodetector arranged along a direction of optical path.

In certain exemplary embodiments, the liquid crystal cell and the objective lens have the same confocal plane.

In certain exemplary embodiments, in the photographic system, the following equation is satisfied:

$$\frac{D}{f_1} = \frac{d}{f_2};$$

wherein, D is an aperture size of the objective lens, $f_1$ is a focal length of the objective lens, d is an aperture size of the liquid crystal cell, $f_2$ is a focal length of the liquid crystal cell.

BRIEF DESCRIPTION OF THE DRAWINGS

Other features, objects and advantages of the present disclosure will become clearer through the detailed descriptions of the non-restrictive embodiments made with reference to the drawings below.

DETAILED DESCRIPTION

The present disclosure will be described in further detail below with reference to the drawings and embodiments. It shall be understood that the specific embodiments described herein are only for explaining the present disclosure, but they do not intend to limit the disclosure. It shall also be noted that to facilitate description, the figures only show the parts related to the disclosure.

It shall be pointed out that embodiments of the present disclosure and features in the embodiments can be combined. The present disclosure will be described below in conjunction with the embodiments and with reference to the drawings.

Figure 1:
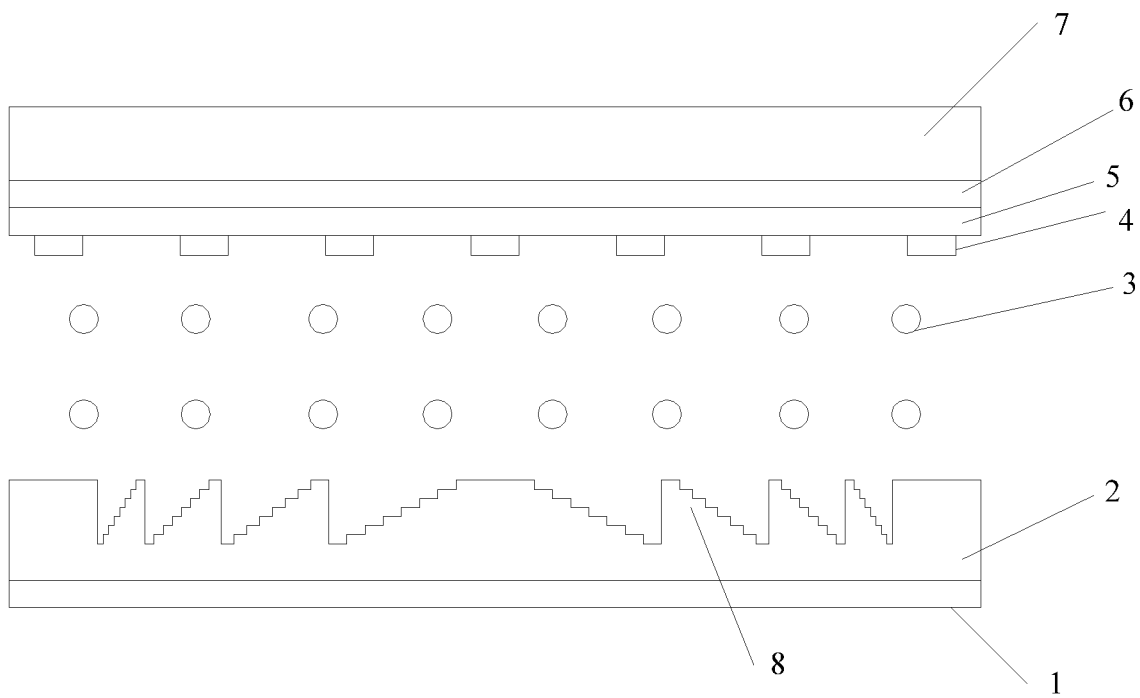
FIG. 1 is a sectional view of a liquid crystal cell according to an embodiment of the present disclosure.

FIG. 1 is a sectional view of a liquid crystal cell according to an embodiment of the present disclosure. As shown in FIG. 1, the liquid crystal cell comprises a refractive index switching layer. The refractive index switching layer comprises a liquid crystal layer 3 and a substrate on which a plurality of diffractive lenses 2 are formed (FIG. 1 only shows the case of one diffractive lens 2). The liquid crystal layer 3 consists of liquid crystals that at least fill grating grooves of the respective diffractive lenses 2. The liquid crystal cell further comprises a first transparent electrode layer 4 and a second transparent electrode layer 6. The liquid crystal layer 3 has a first refractive index and a second refractive index, respectively under the condition that the first transparent electrode layer 4 and the second transparent electrode layer 6 are powered on and off, wherein the first refractive index is greater than the second refractive index, and the first refractive index is the same as the refractive index of the diffractive lenses 2.

Under the condition that the liquid crystal layer 3 has the first refractive index, the entire liquid crystal cell functions as plane glass, and under the condition that the liquid crystal layer 3 has the second refractive index, the entire liquid crystal cell functions as a diffractive lens. In the case where the liquid crystal cell is used in the photographic system, when the liquid crystal cell functions as the diffractive lens, the photographic system can obtain a low-resolution clear image having a depth of the entire object space (i.e. light field imaging); when the liquid crystal cell functions as the plane glass, the photographic system can obtain a high-resolution clear image within a depth of field of a certain object plane (i.e. imaging of a conventional digital photographic system). The above solution realizes free and controllable switch between the light field imaging and the conventional photographic system imaging in the same system.

In some embodiments, in order to adapt the liquid crystal cell to the natural light environment, a polarizer 1 is arranged at an upper or a lower side of the refractive index switching layer. The upper side of the refractive index switching layer refers to the side of the refractive index switching layer far away from the diffractive lens, and the lower side of the refractive index switching layer refers to the side of the refractive index switching layer near the diffractive lens. When the liquid crystal cell is being used, the natural light first passes through the polarizer 1 to form linear polarized light and then passes through the refractive index switching layer. In the linear polarized light environment, the liquid crystal cell may not include the polarizer 1.

In some embodiments, a plurality of concentric circular diffractive phase grating strips 8 are arranged a sides of each of the diffractive lenses 2 facing the liquid crystal layer 3, a gap between two adjacent circular diffractive phase grating strips 8 is a grating groove. The circular diffractive phase grating strips can, but are not limited to, be formed by etching on the substrate.

In some embodiments, the first transparent electrode layer 4 and the second transparent electrode layer 6 are located at the same side (e.g. the upper side or the lower side) of the refractive index switching layer; or the first transparent electrode layer 4 and the second transparent electrode layer 6 are located at the two sides (i.e. different sides) of the refractive index switching layer, respectively.

Figure 2:
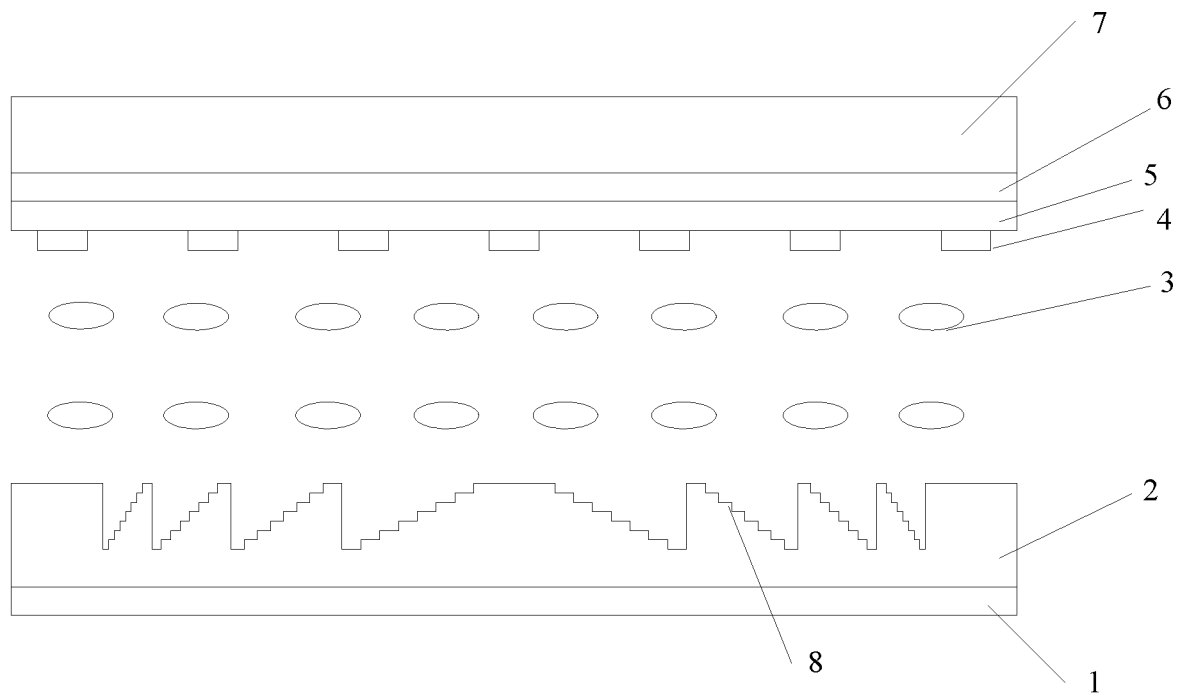
FIG. 2 is a schematic drawing of a liquid crystal cell according to an embodiment of the present disclosure, in which one of the diffractive lenses has a second refractive index.

In the case that the first transparent electrode layer 4 and the second transparent electrode layer 6 are located at the same side of the refractive index switching layer, in certain exemplary embodiments, the first transparent electrode layer 4 is located on a side of the liquid crystal layer 3 far away from the diffractive lenses, and a transparent insulating layer 5 is disposed on a side of the first transparent electrode layer 4 far away from the liquid crystal layer 3, the second transparent electrode layer 6 is disposed on a side of the transparent insulating layer 5 far away from the first transparent electrode layer 4, and a substrate 7 is disposed on a side of the second transparent electrode layer 6 far away from the transparent insulating layer 5. By means of such a structure, if the liquid crystal layer uses a common positive liquid crystal material, initial alignment needs to be performed to the liquid crystal layer. During the initial alignment, a transmission axis of the polarizer 1 is made to be perpendicular to an initial alignment direction of the long axes of the liquid crystal molecules, i.e. vertical alignment. FIG. 1 only shows the case of the transmission axis being parallel to the paper plane, and the transmission axis can be considered as in a left-and-right horizontal direction as shown in FIG. 1. Then, under the condition that the first transparent electrode layer 4 and the second transparent electrode layer 6 are not powered on, the liquid crystal layer 3 has the second refractive index, i.e. a low refractive index, with respect to the incident polarized light. Under the condition that the first transparent electrode layer 4 and the second transparent electrode layer 6 are powered on, a voltage difference is generated therebetween, so that the liquid crystal molecules in the liquid crystal layer are driven by an electric field to exhibit a liquid crystal deflection state as shown in FIG. 2. It can be seen that the long axes of the liquid crystals are parallel to the paper plane, which can be considered as being in the left-and-right horizontal direction as shown in FIG. 1 and parallel to the transmission axis of the polarizer. At this time, the liquid crystal layer 3 has a high refractive index, i.e. the first refractive index, for the incident polarized light. Under the condition that the first transparent electrode layer 4 and the second transparent electrode layer 6 are powered off, the liquid crystal molecules restore to their initial states, and the refractive index of the liquid crystal layer 3 restores to the second refractive index. Of course, under certain circumstances, the initial alignment may not be performed to the liquid crystal molecules, which mainly depends on the shapes of the liquid crystal molecules. For example, under the condition that a material of blue-phase liquid crystal molecules is used, since the molecules thereof have an initial state of a globe, no initial alignment needs to be performed.

Figure 3:
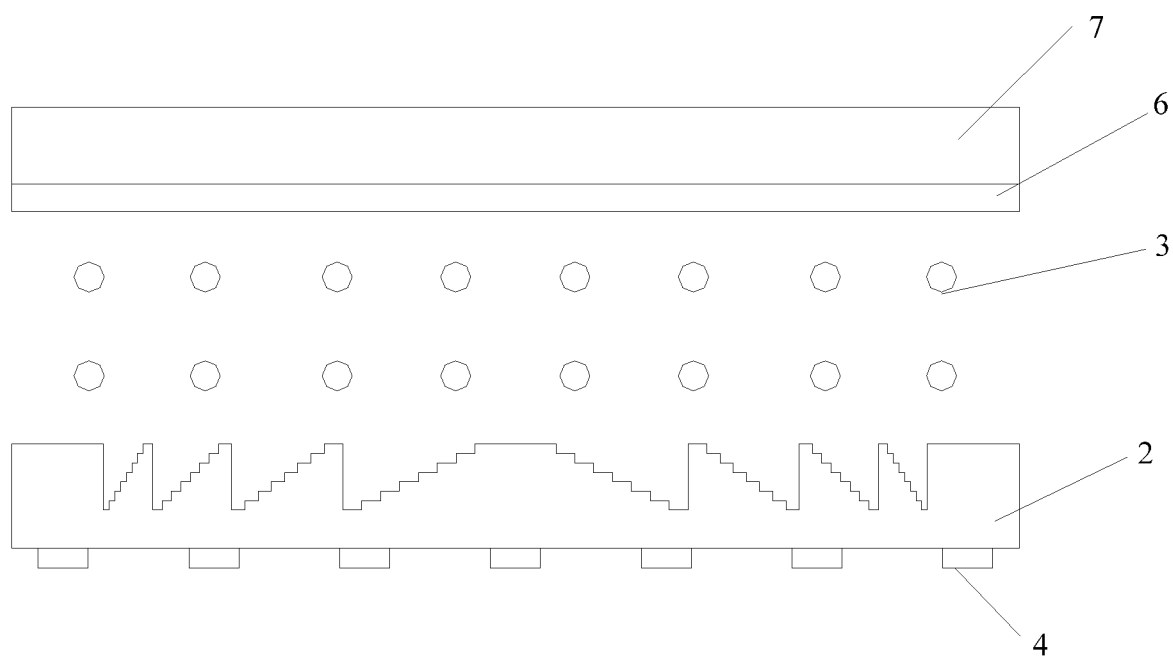
FIG. 3 is a sectional view of a liquid crystal cell according to another embodiment of the present disclosure.

Under the condition that the first transparent electrode layer 4 and the second transparent electrode layer 6 are respectively located at different sides of the refractive index switching layer, in certain exemplary embodiments, as shown in FIG. 3, the first transparent electrode layer 4 is disposed on a side of the diffractive lens 2 far away from the liquid crystal layer 3, and the second transparent electrode layer 6 is disposed on a side of the liquid crystal layer 3 far away from the diffractive lens 2. Of course, the first transparent electrode layer 4 and the second transparent electrode layer 6 can exchange positions. By means of such a structure, when the liquid crystal layer 3 uses a common positive liquid crystal material, a parallel alignment needs to be performed to the liquid crystal layer.

As for the expression of one layer being located/disposed on a side of another layer used in this text, it can mean that these two layers are in direct contact, or it can mean that other layer-shape structures are disposed between these two layers. In addition, the vertical alignment and parallel alignment of the liquid crystal are known by those skilled in the art, so they will not be further explained herein.

In some embodiments, one of the first transparent electrode layer 4 and the second transparent electrode layer 6 is a strip electrode layer comprising parallel strip electrodes, and the other of them is a planar electrode layer. For example, the first transparent electrode layer 4 is a strip electrode layer and the second transparent electrode layer 6 is a planar electrode layer. By means of such a structure, a strip electric field may be formed between the first transparent electrode layer 4 and the second transparent electrode layer 6. Driven by the strip electric field, the liquid crystal molecules deflect, and the refractive index switches between the first refractive index and the second refractive index.

In some embodiments, the circular diffractive phase grating strip 8 satisfies the following equations:

$$N = 2^m;$$

$$\phi = \frac{2\pi}{N};$$

$$h = \frac{\frac{\lambda}{N}}{n - n_0};$$

$$d_j = r_j - r_{j-1};$$

$$r_j = \sqrt{jf\lambda};$$

-continued $$t_j = \begin{cases} \dfrac{d_j}{N}{2}, & (j \text{ is an even number}) \\ d_j - \sum_{i=1}^{m-1} \dfrac{d_{j+1}}{2^i}, & (j \text{ is an odd number}) \end{cases};$$

wherein, N is the number of steps of each of the circular diffractive phase grating strips, m is a natural number, φ is a phase difference between adjacent steps, h is a step height, λ is a wavelength of incident polarized light, n is a refractive index of the diffractive lens, $n_0$ is the second refractive index, $d_j$ is a Fresnel zone width, j is a Fresnel zone number, $r_j$ is a Fresnel zone radius, f is a focal length of a Fresnel lens, $t_j$ is a step width of the circular diffractive phase grating strip.

Figure 4:
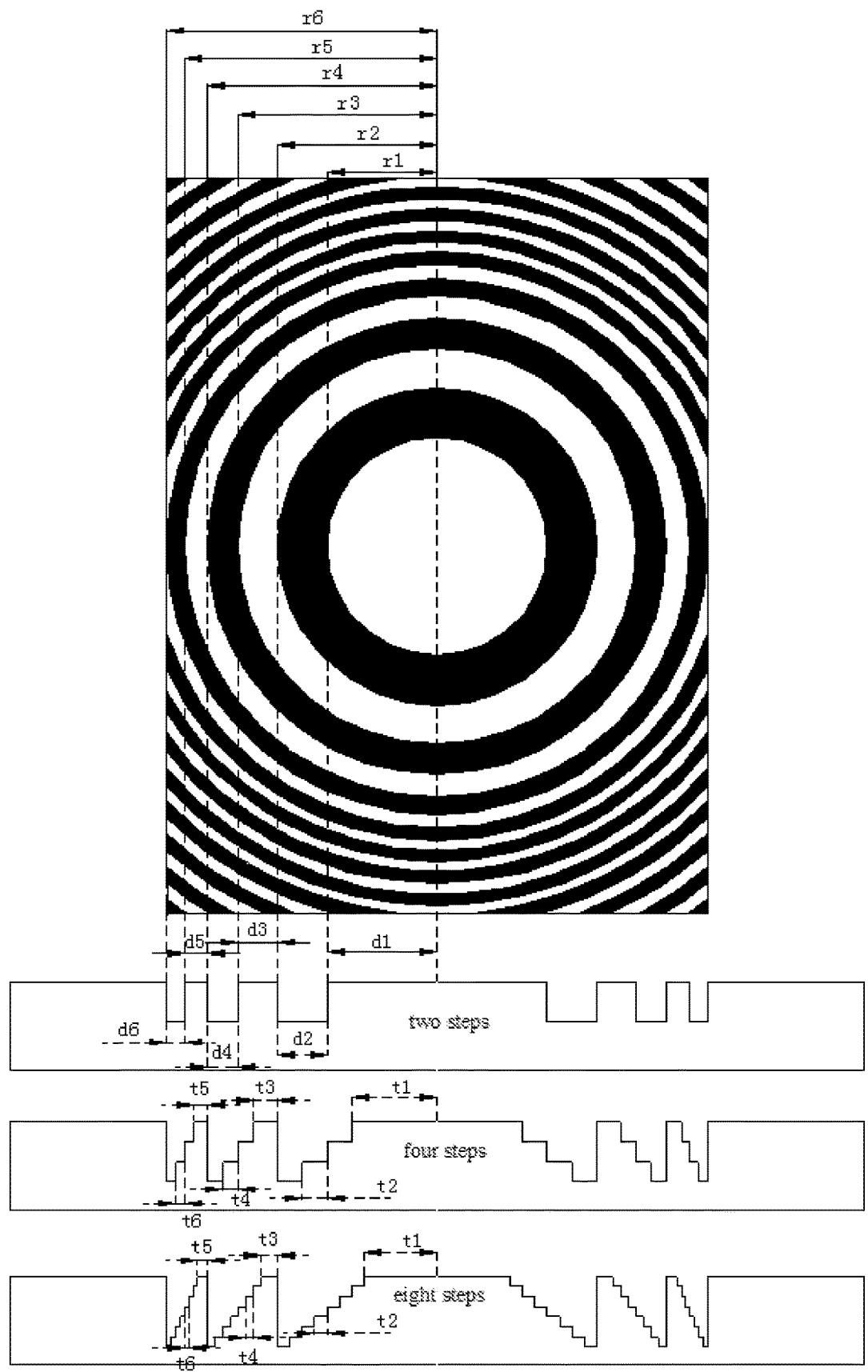
FIG. 4 is a diagram showing the correspondence between a diffractive lens and a Fresnel zone according to an embodiment of the present disclosure.

According to the above equations, FIG. 4 shows the relationship between the number of steps of the circular diffractive phase grating strip of the diffractive lens and the Fresnel zone. FIG. 4 only shows the structures in which the diffractive lens has 2, 4 and 8 steps. The circular diffractive phase grating strips are sparse at the center of the circle but gradually becoming dense towards the outside, and the width distribution of the steps is related to the width distribution of the Fresnel zone. In the case that the circular diffractive phase grating strip has two steps, the width distribution of the steps is the same as the width distribution of the Fresnel zone. In the case that the number of steps is greater than two, the width of the step (e.g. t1, t3, t5) at the top of each circular diffractive phase grating strip is greater than the widths of the rest steps (e.g. t2, t4, t6), and the widths of the rest steps are the same. That is, each circular diffractive phase grating strip has a width of one top step and a width of N−1 rest steps, and the width of the top step corresponds to the expression in which j is an odd number, while the width of the rest steps correspond to the expression in which j is an even number.

In some embodiments, the plurality of diffractive lenses are arranged in the form of a matrix, thus forming an array of diffractive lenses, for example, an array of diffractive lenses with a rows and b columns, a and b both being natural numbers.

Figure 5:
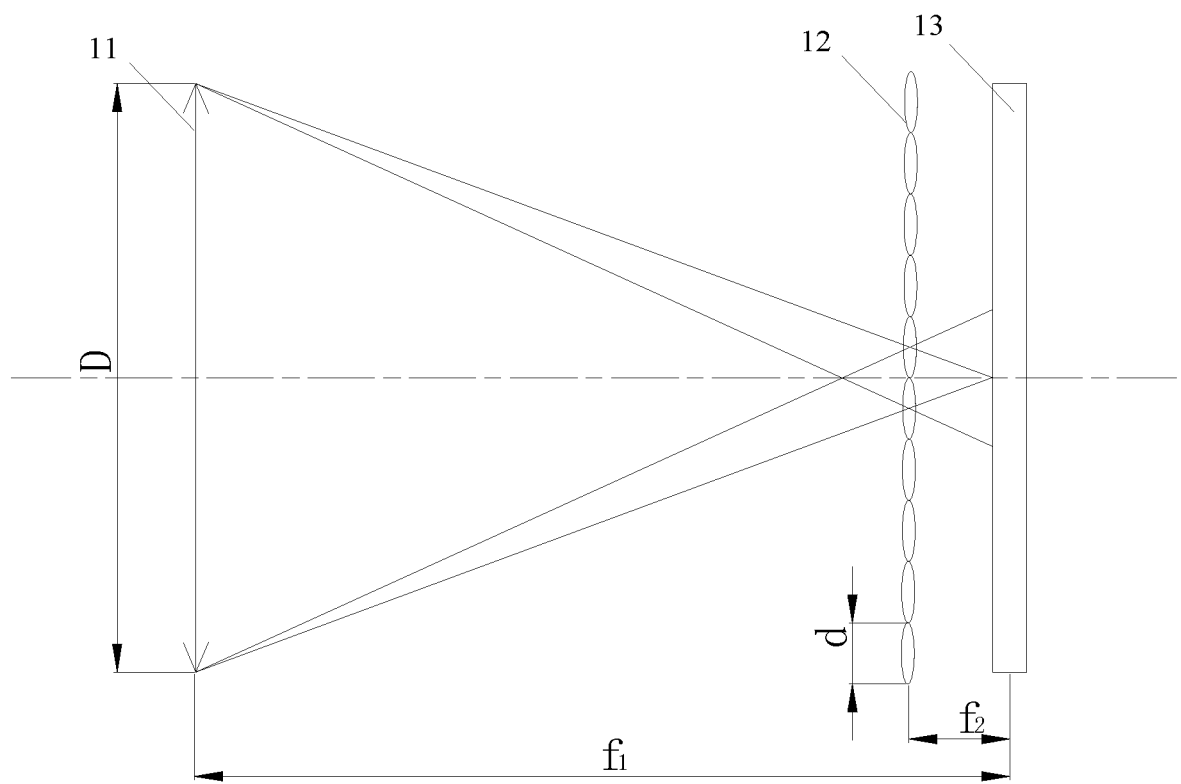
FIG. 5 is a schematic principle diagram of a photographic system according to an embodiment of the present disclosure.

FIG. 5 is a schematic principle diagram of a photographic system according to an embodiment of the present disclosure. As shown in FIG. 5, the photographic system comprises an objective lens 11, the above-mentioned liquid crystal cell 12 and photodetector 13, which are arranged along a direction of optical path. The objective lens mentioned herein is just the so called camera lens.

When the liquid crystal cell functions as the plane glass, the photographic system is the conventional digital photographic system, which can obtain a high-resolution clear image within a depth of field of a certain object plane. When the liquid crystal cell functions as the array of diffractive lenses, the photographic system is the light field photographic system, which can obtain low-resolution clear images having different depths of the entire object space.

In some embodiments, the liquid crystal cell and the objective lens have the same confocal plane, so that a switch can be made between the light field photographing and the conventional digital photographing without adjusting the focal length of the objective lens, namely, an objective lens with a fixed focus can be used.

In some embodiments, as shown in FIG. 5, in order to better utilize the photodetector and avoid a waste of area of the photodetector because of using a large-area photodetector, the following equation needs to be satisfied:

$$\frac{D}{f_1} = \frac{d}{f_2};$$

wherein, D is an aperture size of the objective lens 11, $f_1$ is a focal length of the objective lens 11, d is an aperture size of the liquid crystal cell 12, $f_2$ is a focal length of the liquid crystal cell 12.

Figure 6:
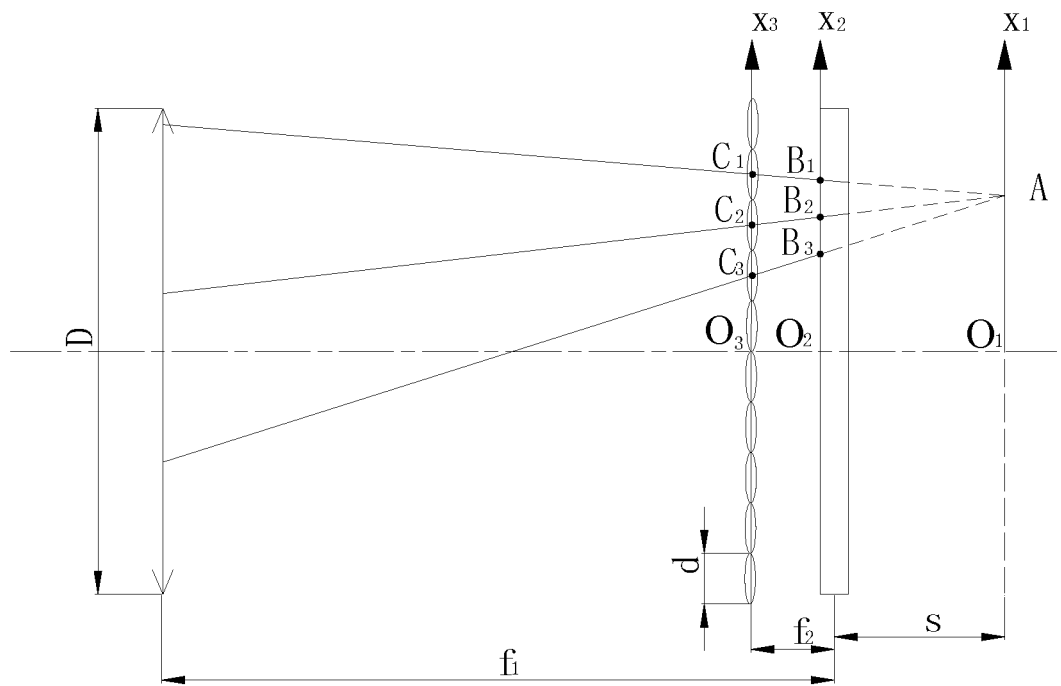
FIG. 6 is a schematic principle diagram of digital focusing of the photographic system according to an embodiment of the present disclosure.

The process and principle of performing digital focusing to obtain a clear image of a depth of the entire space in the present solution will be described below with reference to FIG. 6.

In the state where the liquid crystal layer of the liquid crystal cell has the second refractive index, the liquid crystal cell is an array of diffractive lenses. A rectangular coordinate $x_3O_3y_3$ is built in the plane where the array of diffractive lenses is located (the y-axis perpendicular to the paper is not drawn), a rectangular coordinate $x_2O_2y_2$ is built in the plane of the detector, and a rectangular coordinate $x_1O_1y_1$ is built in the plane of the digital focus image. A light intensity at point A at a focusing distance s equals to a sum of light intensities at all points where the light beam intersects the detector plane when passing through the objective lens and reaching point A through the liquid crystal cell, i.e.

$$E_A = E_{B_1} \pm E_{B_2} \pm E_{B_3} + K; \quad \text{equation (1)}.$$

Given A $(x_1, y_1)$, $B_1$ $(x_2, y_2)$, $C_1$ $(x_2, y_2)$, then:

$$x_2 = \frac{s(x_3 - x_1)}{s + f_2} + x_1; \quad \text{equation (2)}$$

$$y_2 = \frac{s(y_3 - y_1)}{s + f_2} + y_1; \quad \text{equation (3)}$$

It can be seen from equations (1), (2) and (3) that as for the image plane at any distance s during digital focusing, the light intensity distribution at each point thereon is a superimposition of corresponding light intensity points on the detector $x_2O_2y_2$ plane. By means of such calculation, the light intensity distribution on any image plane can be obtained, That is, a plane of the object space corresponding to any focusing image plane can be calculated, so clear imaging of different depths of the entire object space can be realized. Under this mode, owing to the limitation of aperture of the liquid crystal cell, the resolution of the obtained image is lower than that of the conventional digital photographic system.

When the liquid crystal cell functions as the plane glass (the liquid crystal layer has the first refractive index), the photographic system can obtain a high-resolution clear image within a depth of field of a certain object plane, i.e. imaging of a conventional digital photographic system.

Therefore, the photographic system can obtain both low-resolution clear images having different depths of the entire object space and high-resolution clear images within a depth of field of a certain object plane.

The above described are embodiments of the present disclosure and explanations of the technical principles applied. Those skilled in the art shall understand that the scope of the present disclosure is not limited to technical solutions formed by specific combinations of the above technical features, but the scope also covers other technical solutions formed by freely combining the above technical features or their equivalents under the concept of the present disclosure.

The invention claimed is:

1. A liquid crystal cell, comprising:
   a refractive index switching layer, wherein the refractive index switching layer comprises:
      a liquid crystal layer consisting of liquid crystals, and
      a substrate on which a plurality of diffractive lenses are formed;
   a first transparent electrode layer; and
   a second transparent electrode layer;
   a polarizer arranged on a side of the refractive index switching layer selected from a group consisting of a side of the refractive index switching layer close to the diffractive lenses and a side of the refractive index switching layer far from the diffractive lenses;
   wherein, the liquid crystal layer has a first refractive index under the condition that the first transparent electrode layer and the second transparent electrode layer are powered on, and the liquid crystal layer has a second refractive index under the condition that the first transparent electrode layer and the second transparent electrode layer are powered off; and
   wherein the first refractive index is greater than the second refractive index, and the first refractive index is the same as a refractive index of the diffractive lenses.

2. The liquid crystal cell according to claim 1, wherein a plurality of concentric circular diffractive phase grating strips are arranged on a side of each of the plurality of diffractive lenses facing the liquid crystal layer, wherein a gap between two adjacent circular diffractive phase grating strips is a grating groove, and wherein the liquid crystals at least fill the grating groove.

3. The liquid crystal cell according to claim 2, wherein the first transparent electrode layer and the second transparent electrode layer are located at a same side of the refractive index switching layer.

4. The liquid crystal cell according to claim 2, wherein the first transparent electrode layer and the second transparent electrode layer are located at different sides of the refractive index switching layer.

5. The liquid crystal cell according to claim 3, wherein one of the first transparent electrode layer and the second transparent electrode layer is a strip electrode layer comprising parallel strip electrodes, and the other of the first transparent electrode layer and the second transparent electrode layer is a planar electrode layer.

6. The liquid crystal cell according to claim 4, wherein one of the first transparent electrode layer and the second transparent electrode layer is a strip electrode layer comprising parallel strip electrodes, and the other of the first transparent electrode layer and the second transparent electrode layer is a planar electrode layer.

7. The liquid crystal cell according to claim 2, wherein parameters of the circular diffractive phase grating strip satisfy the following equations:

$$N = 2^m;$$

$$\phi = \frac{2\pi}{N};$$

$$h = \frac{\frac{\lambda}{N}}{n - n_0};$$

-continued $$d_j = r_j - r_{j-1};$$

$$r_j = \sqrt{jf\lambda};$$

$$t_j = \begin{cases} \dfrac{d_j}{N}, & (j \text{ is an even number}) \\ \dfrac{d_j}{2} \\ d_j - \sum_{i=1}^{m-1} \dfrac{d_{j+1}}{2^i}, & (j \text{ is an odd number}) \end{cases};$$

wherein, N is the number of steps of each of the circular diffractive phase grating strips, m is a natural number, φ is a phase difference between adjacent steps, h is a step height, λ is a wavelength of incident polarized light, n is a refractive index of the diffractive lens, no is the second refractive index, $d_j$ is a Fresnel zone width, j is a Fresnel zone number, $r_j$ is a Fresnel zone radius, f is a focal length of a Fresnel lens, $t_j$ is a step width of the circular diffractive phase grating strip.

8. The liquid crystal cell according to claim 1, wherein the plurality of diffractive lenses are arranged in the form of a matrix.

9. A photographic system, comprising an objective lens, the liquid crystal cell according to claim 1, and a photodetector, which are arranged along a direction of an optical path.

10. The photographic system according to claim 9, wherein the liquid crystal cell and the objective lens have the same confocal plane.

11. The photographic system according to claim 9, wherein the following equation is satisfied:

$$\frac{D}{f_1} = \frac{d}{f_2};$$

wherein, D is an aperture size of the objective lens, $f_1$ is a focal length of the objective lens, d is an aperture size of the liquid crystal cell, $f_2$ is a focal length of the liquid crystal cell.

12. The photographic system according to claim 9, wherein a plurality of concentric circular diffractive phase grating strips are arranged on a side of each of the plurality of diffractive lenses facing the liquid crystal layer, wherein a gap between two adjacent circular diffractive phase grating strips is a grating groove, and wherein the liquid crystals at least fill the grating groove.

13. The photographic system according to claim 12, wherein the first transparent electrode layer and the second transparent electrode layer are located at a same side of the refractive index switching layer.

14. The photographic system according to claim 12, wherein the first transparent electrode layer and the second transparent electrode layer are located at different sides of the refractive index switching layer.

15. The photographic system according to claim 13, wherein one of the first transparent electrode layer and the second transparent electrode layer is a strip electrode layer comprising parallel strip electrodes, and the other of the first transparent electrode layer and the second transparent electrode layer is a planar electrode layer.

16. The photographic system according to claim 14, wherein one of the first transparent electrode layer and the second transparent electrode layer is a strip electrode layer comprising parallel strip electrodes, and the other of the first transparent electrode layer and the second transparent electrode layer is a planar electrode layer.

* * * * *